May 4, 1926.  
W. C. LOUD  
1,583,235  
AUTOMOBILE CURTAIN  
Filed Dec. 1, 1924  
2 Sheets-Sheet 1
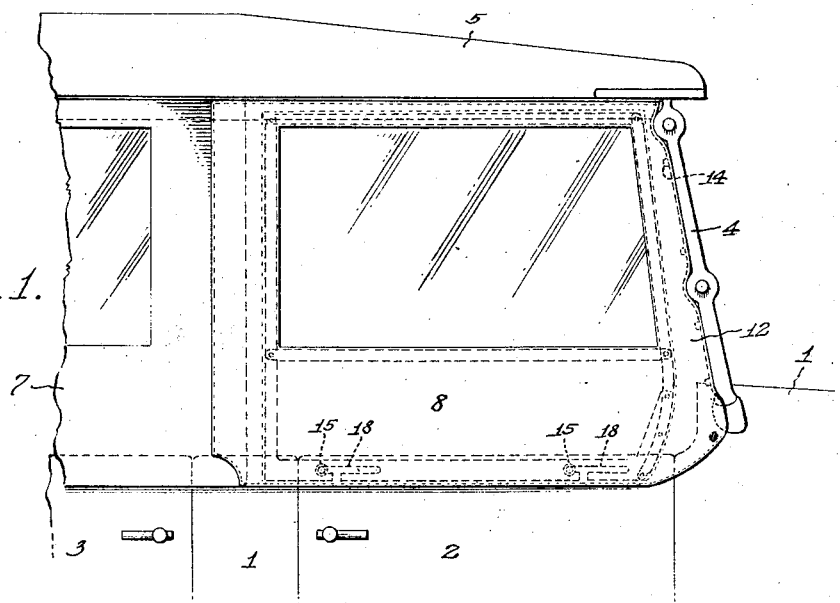
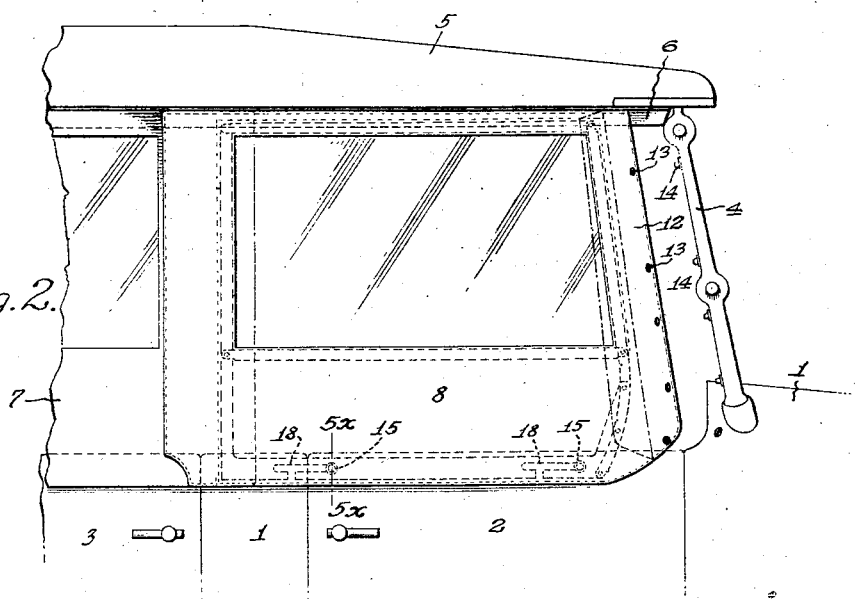
Inventor  
William C. Loud,  
By  
Attorneys May 4, 1926.
W. C. LOUD
1,583,235
AUTOMOBILE CURTAIN
Filed Dec. 1, 1924   2 Sheets-Sheet 2
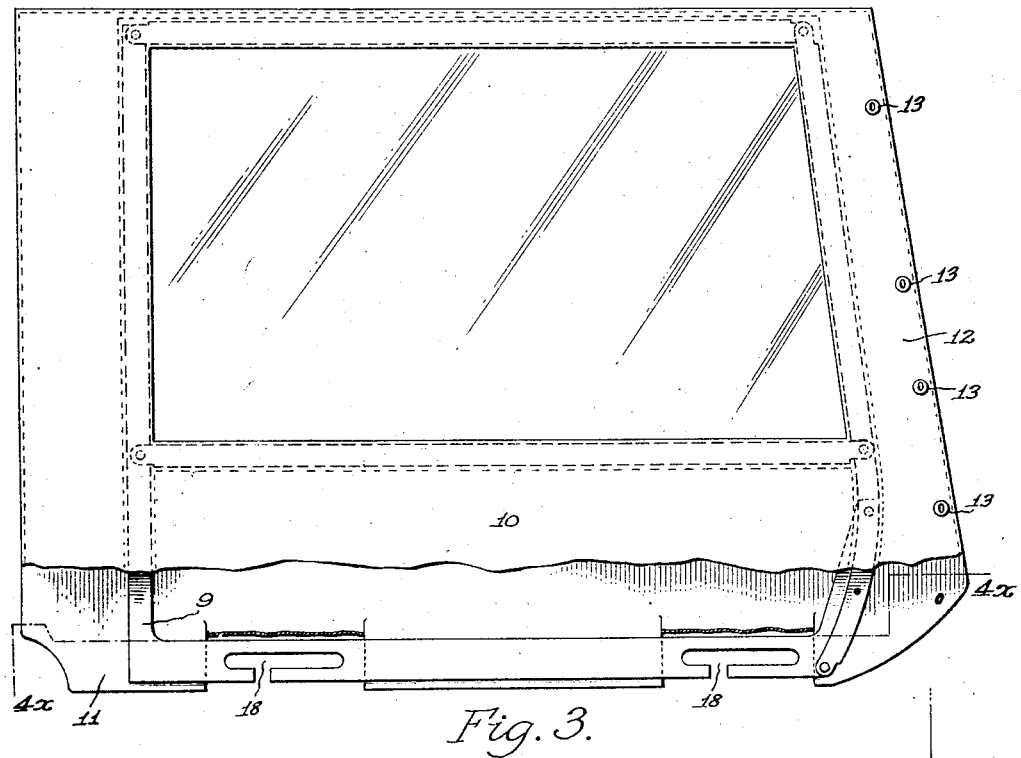
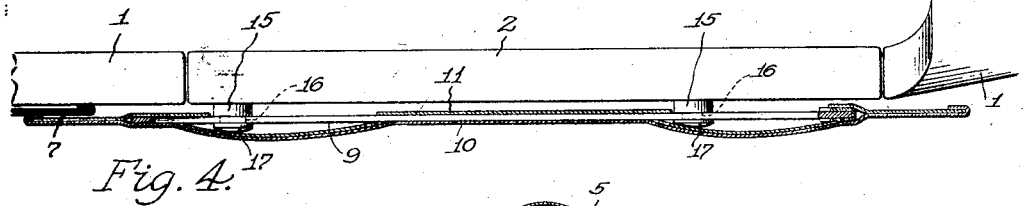
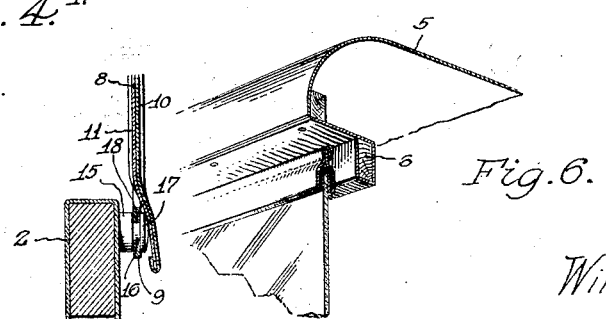
Inventor
William C. Loud,
By
Attorneys Patented May 4, 1926.

1,583,235

UNITED STATES PATENT OFFICE.

WILLIAM C. LOUD, OF DETROIT, MICHIGAN, ASSIGNOR TO GLASSMOBILE COMPANY, OF DETROIT, MICHIGAN, A CORPORATION OF MICHIGAN.

AUTOMOBILE CURTAIN.

Application filed December 1, 1924. Serial No. 753,130.

*To all whom it may concern:*

Be it known that I, WILLIAM C. LOUD, a citizen of the United States, residing at Detroit, in the county of Wayne and State of Michigan, have invented certain new and useful Improvements in Automobile Curtains, of which the following is a specification, reference being had to the accompanying drawings.

This invention relates to automobile side curtains or enclosures of a detachable nature such as of the type described in my pending application, Serial No. 602,946, filed November 24, 1922.

Ordinarily in side curtain construction no adequate means are provided for ventilation such as is more especially desirable in warm weather or on occasions when the complete enclosure of a vehicle by the said curtains is not desirable and the complete removal of the side curtains or any one of them is not convenient; or, where ventilating means are provided, such means have been of a more or less cumbersome nature not capable of being readily brought into use or unduly complicating the structure of the side curtains, in some cases reducing the protective efficiency of the side curtains against the elements and in other cases involving a structure which detracts from the appearance of the said curtains.

By my invention I improve the usefulness of such enclosures by providing for the adjustment of a panel of the enclosure in a manner permitting of the disclosing of a ventilating opening and providing such opening at a location eminently adapted for the efficient ventilation of the interior of a vehicle fitted with side curtains; the invention having as a further object the simple mounting of a side curtain panel in a manner admitting of its ready adjustment to provide or to shut off a ventilating opening, the freedom of such adjustment being obtained when the vehicle door upon which the mounting of the curtain is effected is open and the locking of the curtain in one or other of its adjusted positions being effected when the said door is closed.

It is also an object of the said invention to secure, with the provision for a ventilating opening, an improvement in visibility about the lateral extremities of the windshield of a vehicle to which my improved curtain is applied, whereby the adjustment of the curtain may be utilized both for purposes of securing ventilation and of attaining said increased visibility; and a still further object is to provide for the mounting of a side curtain panel upon the front door of an automobile in such manner that the forward edge of the said panel may be closed upon the adjacent edge of the windshield of the vehicle to prevent entry of the elements around such windshield and slidably withdrawn from its engagement with the said windshield to provide an opening about the edge of the said windshield for purposes of ventilation and for visibility.

Still further objects subsidiary to or resulting from the aforesaid objects, or from the construction or operation of the invention as it may be carried into effect, will become apparent as the said invention is hereinafter disclosed.

In carrying the said invention into effect, I may provide in a side curtain enclosure for vehicles comprising panels arranged between the body and the canopy of the vehicle; a forward panel adapted to extend from the edge of the vehicle windshield beyond the forward edge of the adjacent rearward panel, whereby it forms a closure between said windshield and the said adjacent panel; fastenings on the door of the vehicle with which longitudinally slotted portions of the said panel slidably engage for the securing of the said panel in position and to permit the longitudinal sliding adjustment of the said panels, the relative arrangement of the slots and fastenings being such that the said curtain may be moved rearwardly of the vehicle to effect the spacing of the forward edge of the curtain from the said windshield and thereby disclose an opening therebetween; and a bumper strip situated beneath the canopy of the vehicle engaging the upper portion of the said panel and resisting its movement when the panel is closed thereupon by the closing of the vehicle door, the said panel being adjustable when the said door is open and locked in its adjusted position when the door is closed, all of which is more particularly described and ascertained hereinafter, by way of example, having reference to the accompanying drawings, wherein—

Figure 1 illustrates in elevation part of a vehicle to which my improved side curtain panel is applied;

Figure 2 is a similar view to Figure 1, illustrating the said panel in its open adjustment for purposes of ventilation or visibility;

Figure 3 is a detail view in elevation of the panel drawn to a somewhat larger scale, part of the covering being broken away to better illustrate the construction;

Figure 4 is a sectional view taken on the line 4×—4×, Figure 3, but illustrating the parts as being mounted on the door of a vehicle;

Figure 5 is an enlarged transverse sectional detail view taken on the line 5×—5×, Figure 2, and Figure 6 is a fragmentary sectional perspective view illustrating the engagement of the upper part of the panel with a bumper strip arranged beneath the canopy of the vehicle.

Similar characters of reference indicate similar parts in the several figures of the drawings.

The example shows part of an automobile having a body 1 provided with front and rear doors 2 and 3, a windshield 4, and a canopy 5, the said canopy being provided with a bumper strip 6 therebeneath in the form of a longitudinal member arranged above and extending approximately in the plane of that side of the body of the vehicle above which it is arranged, or in such position as is preferable for the performance of its hereinafter described functions.

7 and 8 indicate panels of a side curtain arrangement or enclosure, the panel 8 being carried by the front door 2 of the vehicle and the panel by any suitable part of the vehicle body rearward of the said door 2, preferably by the door 3, but the particular form of mounting of the panel 7 is not material to this invention and is therefore not herein described or shown upon the accompanying drawings.

The said panel 8 in this instance comprises a glass enclosing frame 9 extending from the upper part of the vehicle body or door to beyond the lower edge of the bumper strip 6 and enclosed within a fabric, leather or similar envelope 10 which extends rearwardly of the said frame in the form of a preferably flexible wing 11 and forwardly of the said frame in the form of a flexible wing 12 which is provided with fastening means 13 adapted to cooperate with other fastening means 14 provided on the lateral members of the windshield 4, whereby the said wing 12 may be secured to the said windshield in order to exclude the elements, particularly in stormy weather, from the interior of the vehicle.

The wing 11 passes beyond the front edge of and preferably overlaps the adjacent panel 7, and where such adjacent panel is secured to the rear door 3 of the vehicle and is movable therewith, the flexible nature of the wing 11 will permit of the swinging outward and inward of the said panel 7 as required in that case.

The panel 8 is attached to the door 2 by means of studs 15 having shoulders 16 and heads 17 between which the lower member of the frame 9 of the said panel may be received, the said lower member of the frame being provided with T-slots 18 for that purpose, and the horizontal openings of the said T-slots being of substantial length to permit the adjustment of the panel along the said studs forwardly or rearwardly of the vehicle body as and for the purposes hereinafter set forth, and having their receptive openings intermediate of the ends of the T-heads so that complete engagement of the frame with the studs is maintained when the panel is in either its fully closed or open position.

Ordinarily, the frictional engagement between the studs and the frame is not sufficient to prevent movement of the said panel upon the said studs, but the arrangement of the bumper strip 6 above the door of the vehicle effects, by its abutment with the upper part of the said panel when the door is closed, the binding of the frame upon its supporting studs due to the bumper strip effecting an outward thrust upon the upper part of the said panel, and consequently the panel under such condition is locked against movement. Thus, when the door is open and the upper part of the panel disengaged from the bumper strip, the said panel may be moved in such direction on the studs as the slots in the frame of the panel will permit, and the said panel will be locked in the position to which it is moved upon the closing of the said door.

The closing of the door may, however, not necessarily influence the adjustment of the said panel, although where the device is actually applied to a door as in this example it is a very desirable arrangement, as the fastening means may be such as to offer or be made to offer substantial resistance to undesirable movement of the panel although adapted to permit movement thereof when purposely effected, as would be the condition were a relatively proportioned frictional engagement between the studs and frame provided for.

The object of the adjustable nature of the said panel is to provide for its being moved to a position rearward of its normal position upon disengagement of the forward wing 12 from the windshield, so that when so moved, the said forward wing will be substantially spaced from the said windshield as clearly illustrated in Figure 2, thus permitting access of air between the lateral edge of the windshield and the said wing 12 to the interior of the vehicle for ventilating purposes, and also providing such opening which permits of visibility about the lateral edges of the windshield greater than that which exists when the panel is in its forward or closed position; and it will be apparent that where the said wing 12 is of a substantially flexible nature, it may be folded inwardly of the said panel as indicated in dotted lines in Figure 2 to still further increase the size of the ventilating opening.

The application of the invention has been for purposes of illustration described in connection solely with the forward panel of an enclosure, but it will be quite apparent that the adjustable features may be similarly incorporated in an intermediate panel wherein other panels or other devices are situated forward thereof instead of the adjustable panel being directly associated with the windshield as in the illustrated example, but the benefits of visibility and also of fully effective ventilation are more apparent when the opening is provided at the lateral edges of or adjacent to the windshield of the vehicle. Also with the ventilating opening so disposed the outward flow of air from the front of the windshield tends to cause a more or less exhaust ventilation or suction which minimizes draft in the vehicle such as is usually experienced when the windows of a car are opened for ventilating purposes.

It is characteristic of this invention that it does not involve a complicity of parts or adjustments in order to attain the beneficial results hereinbefore set forth, and additional mechanism or operable parts beyond those required for the support of the panel are not called for, neither are any attachments or movable parts or closures required to be mounted upon or within the panel as has been usual with side curtain constructions as heretofore known, wherein slidable windows, hinged closures, rotary ventilators and similar auxiliary and more or less cumbersome devices have been employed. Furthermore, the providing of a substantially vertical ventilating opening ensures a much more effective ventilation of the interior of a vehicle than is feasible with other forms of openings, usually of a very restricted nature, and the vertical nature of such ventilating opening lends itself to the obtaining of much greater visibility and convenience thereof than is usually obtained by openings otherwise arranged.

This invention may be developed within the scope of the following claims without departing from the essential features of the said invention, and it is desired that the specification and drawings be read as merely illustrative and not in a limiting sense, except as necessitated by the prior art.

What I claim is:—

1. In combination with a vehicle having a door, a canopy, a side curtain enclosure including a panel supported by, swingable with and horizontally slidable on said door whereby said enclosure is complete in one position of said panel and a vertically disposed ventilating opening is formed when said panel is slidably moved from its closed position.

2. The combination according to claim 1, and means engaging and locking said panel in its open or closed position when said door is closed.

3. The combination according to claim 1, and a bumper strip arranged beneath said canopy, said strip engaging said panel when said door is closed and locking said panel in its open or closed position.

4. In combination with a vehicle having a door, a windshield forward thereof, and a canopy, a side curtain panel slidably carried by and swingable with said door, said panel normally extending to said windshield, said panel being movable on said door away from said windshield to provide a ventilating opening contiguous thereto and to provide visibility about the margin of said windshield.

5. The combination according to claim 4, and frictional locking means against which said panel bears and is held in its open or closed positions when said door is closed.

6. In combination with a vehicle door, a side curtain enclosure including a horizontally slidable side curtain panel, studs on said door, and a member on said panel slotted to engage said studs, the slots of said member extending inwardly of the edge thereof for the reception of said studs and longitudinally of the receptive part of the slots whereby substantial horizontal sliding of said panel on said studs is permitted in order that said enclosure may be complete in one of the slidable adjustments of said panel and a vertical ventilating opening provided in the other of its slidable adjustments.

7. A side curtain panel according to claim 6 wherein the slots are of T-formation.

8. A side curtain panel according to claim 6 wherein the slots are of T-formation, with the receptive parts thereof disposed substantially towards one end of the heads of said slots.

In testimony whereof I affix my signature.

WILLIAM C. LOUD.